US006826063B2

United States Patent
Ichikawa et al.

(10) Patent No.: US 6,826,063 B2
(45) Date of Patent: Nov. 30, 2004

(54) DC VOLTAGE CONVERTING CIRCUIT

(75) Inventors: Tomoyuki Ichikawa, Shizuoka (JP); Shinji Ohta, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 61 days.

(21) Appl. No.: 10/375,025

(22) Filed: Feb. 28, 2003

(65) Prior Publication Data

US 2003/0214251 A1 Nov. 20, 2003

(30) Foreign Application Priority Data

Mar. 1, 2002 (JP) ...................................... P.2002-056022

(51) Int. Cl.[7] .............................................. H03B 3/24
(52) U.S. Cl. .......................................... 363/41; 315/276
(58) Field of Search ................................ 315/307, 276, 315/224, 291; 363/39, 40, 41, 44, 48, 82, 97, 21.12, 21.15

(56) References Cited

U.S. PATENT DOCUMENTS 5,805,434 A * 9/1998 Vinciarelli et al. ........... 363/41
6,208,089 B1  3/2001 Ito et al.
6,340,870 B1  1/2002 Yamashita et al.
6,477,063 B2 * 11/2002 Ishii et al. ............... 363/21.04
6,552,623 B2 * 4/2003 Nishida et al. ............... 363/19

* cited by examiner

Primary Examiner—Wilson Lee
(74) Attorney, Agent, or Firm—Sughrue Mion, PLLC (57) ABSTRACT

Control is carried out in such a manner that a transformer 10 constituting a DC voltage converting circuit 15 stores energy while a switching element 11 provided on the primary side of the transformer 10 is set in an ON state, and the transformer 10 outputs the energy while the switching element 11 is set in an OFF state, and furthermore, the switching element 11 is turned ON when the energy is completely output from a secondary winding 10s. For this purpose, a duration from a time that a secondary current 12 of the transformer 10 reaches zero to a time that a primary current Ip of the transformer 10 is started to flow is detected, and a switching frequency is changed by control means 16 in order to shorten the duration.

5 Claims, 10 Drawing Sheets

TIME PASSAGE DIRECTION

DC VOLTAGE CONVERTING CIRCUIT

BACKGROUND OF THE INVENTION

1. Field of the Invention

The present invention relates to a technique for increasing a circuit efficiency and reducing a cost in a DC voltage converting circuit of a flyback type.

2. Description of the Related Art

Referring to a DC voltage converting circuit (a so-called DC-DC converter) for converting a DC input voltage into a desirable DC voltage, various configurations have been known.

For example, in the application of a discharge lamp (such as a metal halide lamp) to a lighting circuit, there is a structure of a flyback type as a DC-DC converting circuit for converting a DC input voltage applied from a DC power source into a desirable DC voltage. In other words, a semiconductor switching element is connected to the primary winding side of a transformer for conversion to carry out the ON/OFF control of the element, and a rectifier diode and a smoothing capacitor are provided on the secondary side of the transformer.

Referring to the operation of the flyback type circuit, for example, control is carried out in such a manner that the switching element is turned ON before energy stored in the transformer is completely discharged to the secondary side of the transformer in case of a current continuation mode (that is, the switching element is turned ON before the secondary current of the transformer reaches zero ampere).

Referring to the current continuation mode, there is the following problem of an electric efficiency (a rate of an output power to an input power).

First of all, in the case in which attention is paid to a power loss in the reverse recovery time of a rectifier diode provided on the secondary side of the transformer, the switching element is turned ON while a current flows to the diode. Consequently, the diode is brought into a backward bias state so that a power loss is generated in the reverse recovery time. The total amount of the loss in the reverse recovery time of the diode is proportional to a switching frequency. In the current continuation mode, therefore, the power loss is increased when the frequency is raised.

Moreover, the primary current of the transformer is generated when the switching element is turned ON. Consequently, a turn ON loss of the element is generated.

SUMMARY OF THE INVENTION

The invention has an object to cope with an increase in a switching frequency and to enhance an electric efficiency, and to prevent a cost from being increased remarkably in a DC voltage converting circuit having a flyback type structure.

The invention provides a DC voltage converting circuit having a flyback type structure, wherein in case of a current boundary mode in which control is carried out in such a manner that a switching element is turned ON when energy stored in a transformer is completely discharged to the secondary side of the transformer (that is, the switching element is turned ON when the secondary current of the transformer reaches zero ampere), the current of a rectifier diode reaches zero ampere and the switching element is then turned ON. In consideration of the fact that a power loss is not generated in a reverse recovery time and the highest electric efficiency can be obtained in the current boundary mode in case of a comparatively high switching frequency (for example, several hundreds kHz or more), the following structure is provided in order to solve the problem.

To provide control means for carrying out control in such a manner that a transformer stores energy while a switching element provided on the primary side of the transformer is set in an ON state and the energy is output from a secondary winding while the switching element is set in an OFF state, and the switching element is turned ON when the energy is completely output from the secondary wiring.

To detect a duration from a time that the secondary current of the transformer reaches zero to a time that the primary current of the transformer is started to flow and to change a switching frequency by the control means such that the duration is shortened.

According to the invention, therefore, the switching frequency is controlled such that the duration from the time that the secondary current of the transformer reaches zero to the time that the primary current of the transformer is started to flow is caused to approximate to zero. Therefore, it is possible to implement driving control in the current boundary mode, and furthermore, it is not necessary to provide a high-speed element therefor.

DESCRIPTION OF THE PREFERRED EMBODIMENTS

A DC voltage converting circuit according to the invention has a flyback type circuit structure including a transformer and a switching element provided on the primary side of the transformer, and the transformer stores energy while the switching element is set in an ON state and outputs the energy from a secondary winding while the switching element is set in an OFF state. In the invention, driving control is carried out in a current boundary mode which will be described below. Consequently, the invention is suitable for an enhancement in an electric efficiency, a decrease in the size of a circuit device and a reduction in a cost. For example, the invention can be applied to a discharge lamp lighting circuit (a lighting circuit in a discharge lamp such as a metal halide lamp to be used as a light source of a lighting unit for a vehicle, particularly, in the case in which restrictions are put on the installation space of the device including the lighting circuit), and the invention is not restricted thereto but can widely be applied to various uses such as a power circuit.

Figure 1:
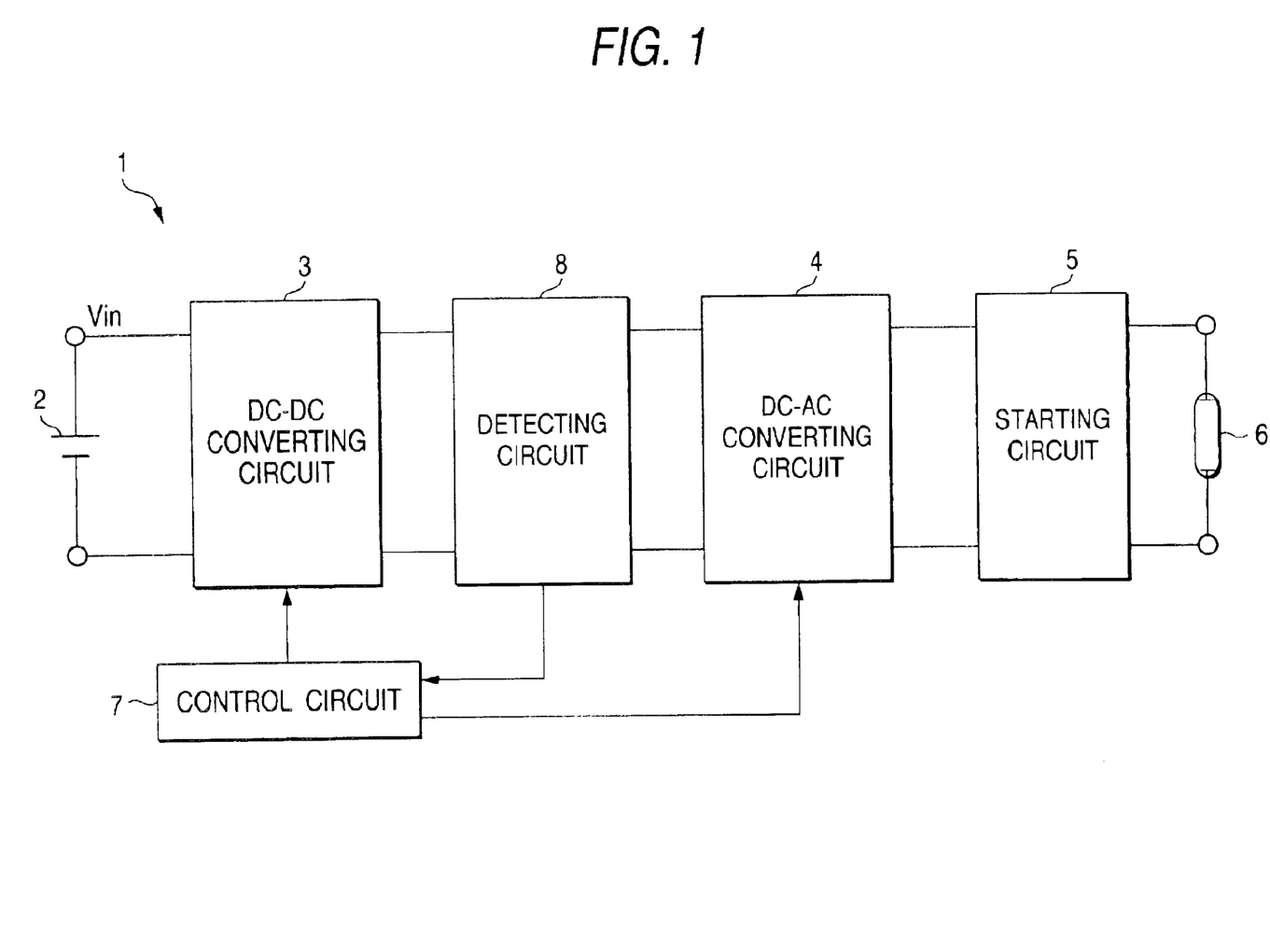
FIG. 1 is a circuit block diagram showing an example of the structure of a discharge lamp lighting circuit.

FIG. 1 shows an example of a basic structure in the case in which the DC voltage converting circuit according to the invention is applied to a discharge lamp lighting circuit.

A discharge lamp lighting circuit 1 comprises a DC power source 2, a DC-DC converting circuit 3, a DC-AC converting circuit 4, a starting circuit 5 and a control circuit 7.

The DC-DC converting circuit 3 is provided for converting a voltage upon receipt of a source voltage applied from the DC power source 2. More specifically, the DC-DC converting circuit 3 serves to convert a DC input voltage (referred to as "Vin") sent from the DC power source 2 into a desirable DC voltage, and has a circuit structure of a flyback type using a transformer and a switching element (which will be described below in detail).

The DC-AC converting circuit 4 is provided for converting the output voltage of the DC-DC converting circuit 3 into an AC voltage and then supplying the same voltage to a discharge lamp 6 through the starting circuit 5. For example, the DC-AC converting circuit 4 includes a bridge type circuit using four semiconductor switching elements and a driving circuit thereof, and serves to reciprocally ON/OFF control two pairs of switching elements, thereby outputting an AC voltage.

The starting circuit (so-called starter) 5 is provided for generating a high voltage pulse signal for starting (a starting pulse) for the discharge lamp 6, thereby starting the discharge lamp 6. The same signal is superposed on an AC voltage output from the DC-AC converting circuit 4 and is thus applied to the discharge lamp 6.

The control circuit 7 serves to control a power to be applied to the discharge lamp 6 upon receipt of a detection signal for a voltage applied to the discharge lamp 6 and a current flowing to the discharge lamp 6 or a corresponding voltage and current thereto, and to control the output of the DC-DC converting circuit 3. For example, the control circuit 7 is provided for controlling a supplied power corresponding to the state of the discharge lamp 6 upon receipt of a detection signal acquired by a detecting section 8 for detecting the output voltage and output current of the DC-DC converting circuit 3, and serves to send a control signal to the DC-DC converting circuit 3, thereby controlling the output voltage. Moreover, the control signal is sent to the DC-AC converting circuit 4 to carry out the control for polarity switching related to an alternating output. The control circuit 7 also serves to raise, to a certain level, the voltage to be supplied to the discharge lamp 6 before the discharge lamp 6 is turned ON, thereby carrying out output control for reliably turning ON the discharge lamp 6. For a switching control method related to the DC-DC converting circuit 3, moreover, there have been known a PWM (pulse width modulation) method and a PFM (pulse frequency modulation) method.

Figure 2:
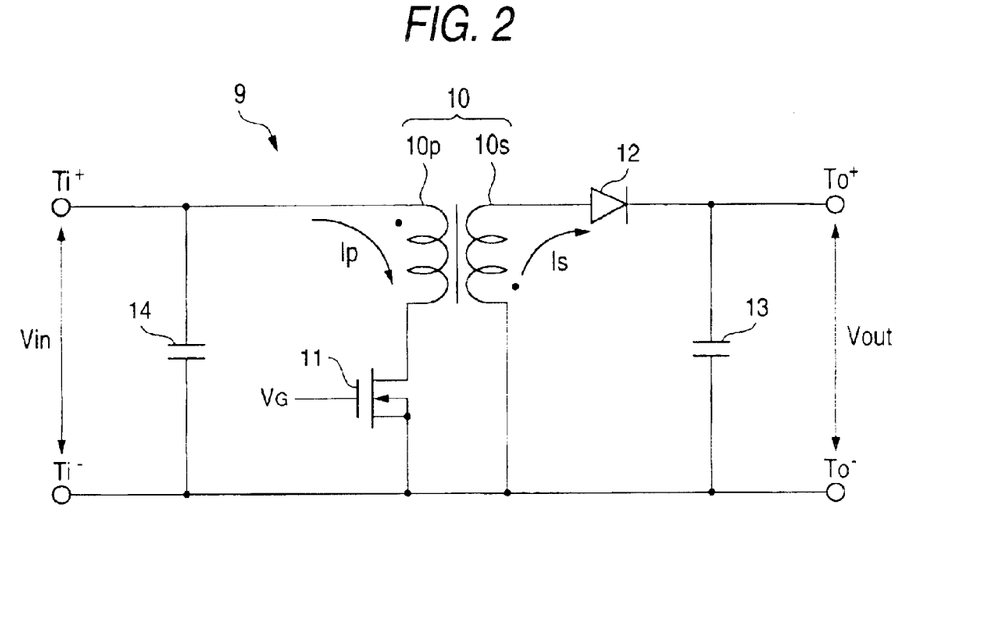
FIG. 2 is a circuit diagram showing an example of the structure of a DC-DC converting circuit.

FIG. 2 shows the main part of a basic structure example 9 of a DC-DC converter of a flyback type (corresponding to a circuit section constituting a feeding system to the discharge lamp in the relationship with the DC-DC converting circuit and the following elements are provided (numerals in parentheses denote designations in FIG. 2).

transformer (10),
switching element (11),
rectifier diode (12), and
smoothing capacitor (13).

In the drawing, terminals "Ti$^+$" and "Ti$^-$" denote input terminals and the DC input voltage "Vin" is supplied thereto, and a capacitor 14 is provided between both of the terminals. Moreover, "To$^+$" and "To$^-$" denote output terminals, and a positive polarity output voltage (hereinafter referred to as "Vout") obtained after the voltage conversion is sent to a post circuit (a DC-AC converting circuit).

The switching element 11 is connected to a primary winding 10$p$ of the transformer 10 (a winding start is shown in a black circle in the drawing), and a driving signal is supplied from the control circuit 7 to the element 11. In the drawing, an N channel MOSFET (field effect transistor) is used for the switching element 11, and has a drain connected to the primary winding 10$p$ of the transformer 10 (a terminal on the winding end side) and has a source connected to the input terminal "Ti$^-$".

The rectifier diode 12 and the smoothing capacitor 13 are provided on the secondary side of the transformer 10. In other words, one of the ends of a secondary winding 10$s$ of the transformer 10 (a terminal on the winding end side) is connected to the anode of the rectifier diode 12 and the other end of the secondary winding 10$s$ (a terminal on the winding start side shown in a black circle in the drawing) is connected to a line coupling the terminals "Ti$^-$" and "To$^-$". The rectifier diode 12 has a cathode connected to the terminal "To$^+$" and one of the ends of the smoothing capacitor 13. The smoothing capacitor 13 is provided between the output terminals "To$^+$" and "To$^-$", and a voltage on both ends of the smoothing capacitor 13 is output as Vout.

In the drawing, "Ip" denotes a primary current of the transformer 10 and "Is" denotes a secondary current of the transformer 10, and "VG" denotes a signal voltage for gate driving of the FET (which corresponds to a control voltage supplied from the control circuit 7).

Referring to the circuit structure of a flyback type, there are the following three operation modes.

Figure 4:
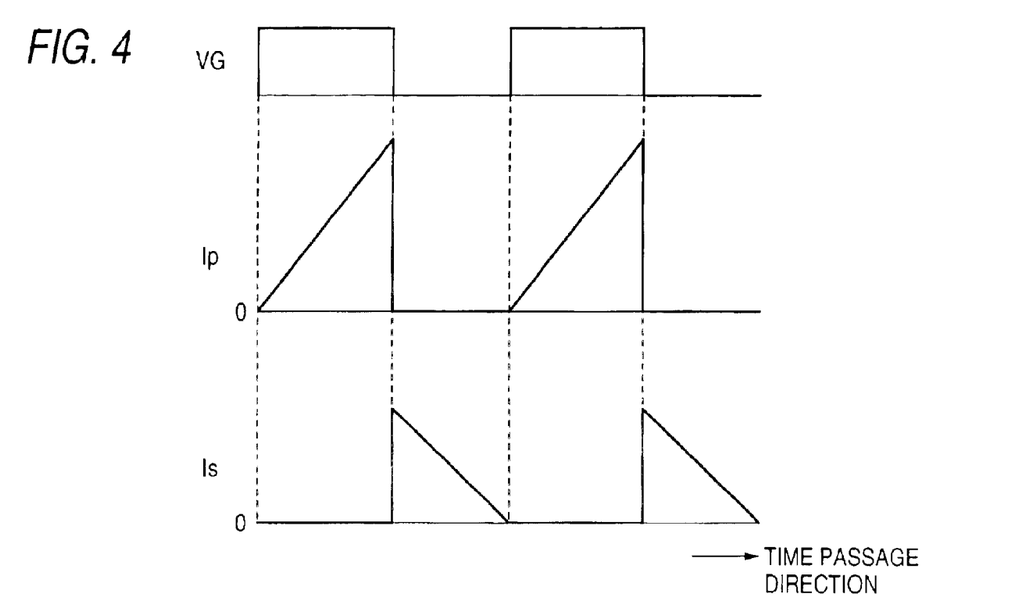
FIG. 4 is an explanatory diagram showing a current boundary mode.
Figure 5:
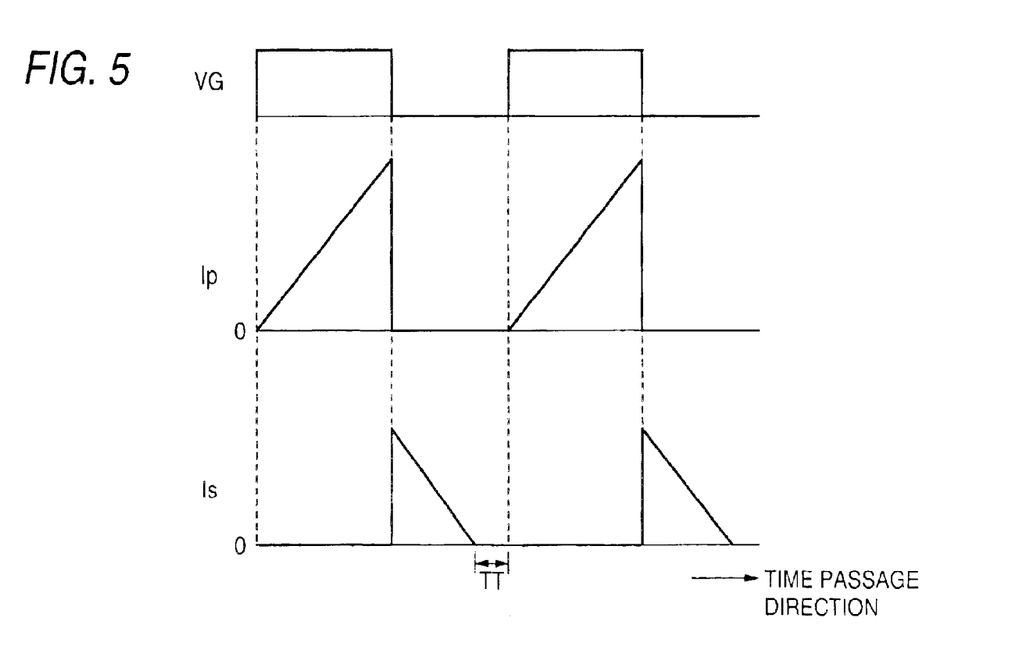
FIG. 5 is an explanatory diagram showing a current discontinuation mode.

(I) Current continuation mode (see FIG. 3),
(II) Current boundary mode (see FIG. 4), and
(III) Current discontinuation mode (see FIG. 5).

Figure 3:
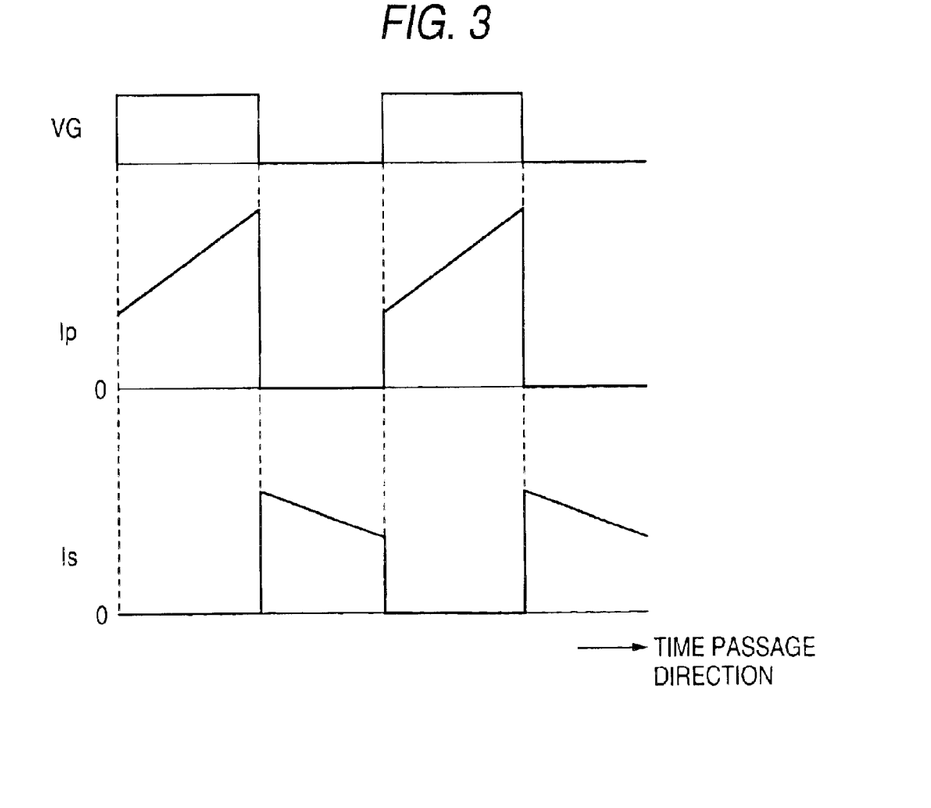
FIG. 3 is an explanatory diagram showing a current continuation mode.

FIGS. 3 to 5 schematically show respective waveforms in order of VG, Ip and Is from a top.

First of all, in the (I) current continuation mode, control is carried out in such a manner that the switching element 11 is turned ON before the energy stored in the transformer 10 is completely discharged to the secondary side of the transformer 10. In other words, as shown in FIG. 3, Ip and Is are not zero ampere at the time of a rising start of VG.

In the (II) current boundary mode, moreover, control is carried out in such a manner that the switching element 11 is turned ON when the energy stored in the transformer 10 is completely discharged to the secondary side of the transformer 10. In other words, as shown in FIG. 4, the switching element 11 is turned ON when the secondary current Is of the transformer reaches zero ampere, and both Ip and Is reach zero ampere at the time of the rising start of VG.

In the (III) current discontinuation mode, control is carried out in such a manner that the switching element 11 is turned ON after a discontinuation period since the energy stored in the transformer 10 is completely discharged to the secondary side of the transformer 10. In other words, as shown in FIG. 5, the switching element 11 is turned ON after a certain time since the secondary current Is of the transformer 10 reaches zero ampere. As shown in "TT" of the drawing, the "discontinuation period" indicates a duration from a time that the secondary current Is of the transformer 10 reaches zero ampere to a time that the primary current Ip of the transformer 10 is started to rise.

In the case in which attention is paid to a power loss in the reverse recovery time of the rectifier diode 12 provided on the secondary side of the transformer 10, the switching element 11 is turned ON while a current flows to the diode 12 in the current continuation mode so that the diode 12 is brought into a backward bias state. Consequently, a power loss is generated in the reverse recovery time. On the other hand, in the current boundary mode or the current discontinuation mode, the current of the rectifier diode 12 reaches zero ampere and the switching element 11 is then turned ON. Therefore, the power loss is not generated in the reverse recovery time. The total amount of the loss in the reverse recovery time of the diode 12 is proportional to a switching frequency (corresponding to the frequency of the control signal of the switching element 11). In the current continuation mode, consequently, the power loss is increased when the frequency is raised.

As compared with each mode for the efficiency of the whole DC-DC converter, moreover, it is apparent that an electric efficiency is high in the current continuation mode if the switching frequency is low and that the electric efficiency is the highest in the current boundary mode in case of high frequency switching of several hundreds kHz or more. In the current discontinuation mode, the turn OFF loss of the switching element 11 is increased, and furthermore, the electric efficiency is lower than that in the current boundary mode by the influence of a resonance operation for the discontinuation period.

In the case in which the DC-DC converter of a flyback type is to be driven at a high switching frequency of several hundreds kHz or more, accordingly, the highest electric efficiency can be obtained by an operation in the current boundary mode. For this purpose, a switching frequency control circuit is required.

Figure 6:
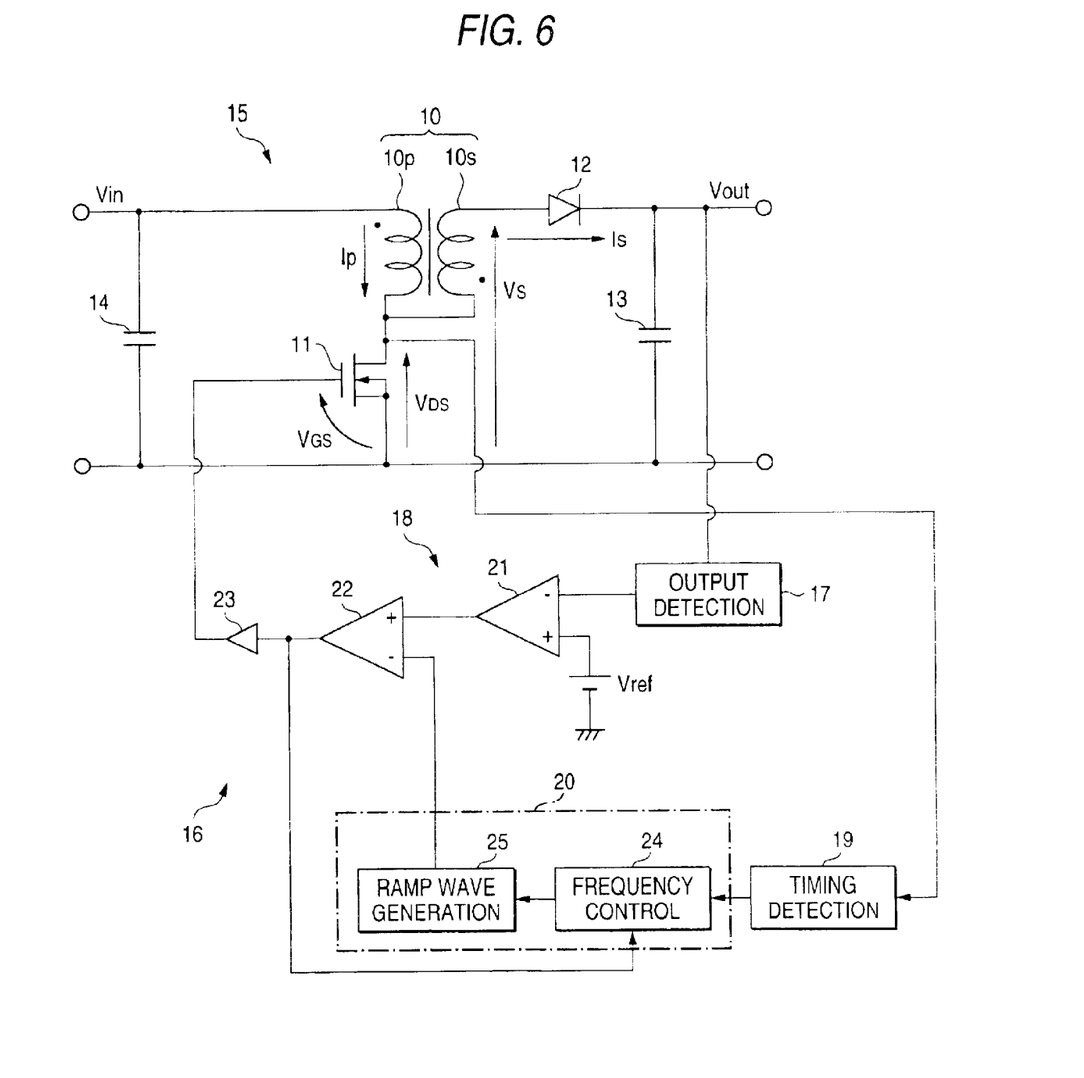
FIG. 6 is a diagram showing an example of the structure of a DC voltage converting circuit according to the invention.

FIG. 6 shows a structure example 15 of a DC voltage converting circuit according to the invention, schematically illustrating the main parts of a DC-DC converting section and a control section. In the example, a PWM control method (a method for changing the duty cycle of a control pulse) is employed, and furthermore, a PFM control method (a method of changing the frequency of the control pulse) can also be employed. Moreover, the transformer 10 is not essentially different from the structure shown in FIG. 2 in that the ends of the primary winding 10p and the secondary winding 10s (the terminal on the winding end side of 10p and the terminal on the winding start side of 10s) are connected to the drain of the N channel FET. In the drawing, "VDS" indicates a drain—source voltage of the FET to be the switching element 11, "VGS" indicates a gate—source voltage of the FET and "Vs" indicates a secondary voltage of the transformer 10.

Control means 16 controls the switching element 11 to be turned ON again when the energy stored in the transformer 10 for the ON period of the switching element 11 is completely output from the secondary winding 10s for the OFF period of the switching element 11. More specifically, the control means 16 is provided for implementing the control in the current boundary mode and comprises the following components (numerals in parentheses indicate designations).

Output detecting section (17),
Arithmetic control section (18),
Timing detecting section (19), and
Ramp wave generating section (20).

The output detecting section 17 is provided for detecting the output voltage or the output current of the transformer 10. In the example, the output detecting section 17 is set to be a voltage detecting section for detecting the output voltage of the transformer 10 which serves to detect a voltage "Vout" output from the secondary winding 10s of the transformer 10 through a rectifying and smoothing circuit (the diode 12, the capacitor 13), and a voltage detected by using a voltage dividing resistor is sent to the negative input terminal (inverted input terminal) of an error amplifier 21 in a second stage, for example.

The error amplifier 21 constitutes the arithmetic control section 18 together with a PWM comparator 22 in the second stage and is provided for controlling the power of a discharge lamp (load). A predetermined reference voltage "VREF" (indicated by the mark of a voltage source in the drawing) is supplied to the positive input terminal of the error amplifier 21. More specifically, a difference between the detected voltage sent from the output detecting section 17 and VREF is obtained and an error signal (a control voltage) is supplied to the positive input terminal of the PWM comparator 22 (a comparing section).

A ramp wave (or a sawtooth wave) is supplied from the ramp wave generating section 20 which will be described below to the negative input terminal of the PWM comparator 22, and a rectangular wave-shaped pulse signal (a PWM pulse) based on a level comparison of a signal of the ramp wave and an error signal sent from the error amplifier 21 is output and is sent to the control terminal of the switching element 11 (a gate in the FET) through a buffer 23. The pulse signal is also sent to (a frequency control circuit of) the ramp wave generating section 20 which will be described below.

Thus, the arithmetic control section 18 including the error amplifier 21 is provided for sending a control signal to the switching element 11 upon receipt of a detection signal sent from the output detecting section 17 and a ramp wave transmitted from the ramp wave generating section 20.

The timing detecting section 19 serves to detect a timing in which the secondary current Is of the transformer 10 reaches 0A. In other words, in the current boundary mode, it is necessary to control the switching element 11 to be turned ON when the energy stored in the transformer 10 is completely discharged to the secondary side. For this reason, a discharge end time related to the secondary current Is will be detected. In the example, the FET is used as the switching element 11. Therefore, a discharge end timing (in which Is reaches zero) related to the secondary current based on the waveform of the drain—source voltage VDS is detected. It is also possible to detect the timing based on Vs described above. However, the level of Vs generates positive and negative voltages for a GND (ground) potential. Therefore, limiters for the positive and negative voltages are required in relation to a signal input to a control section in the second stage. Correspondingly, a structure is slightly complicated. On the other hand, in a circuit configuration for detecting VDS, the level of VDS always generates a positive voltage for the GND potential. Therefore, only the limiter for a voltage in a forward direction is enough so that the structure can be simplified.

The ramp wave generating section (in the example, the PWM ramp wave generating section) 20 generates a ramp wave upon receipt of a signal sent from the timing detecting section 19, and furthermore, changes the frequency of the ramp wave in response to a duration from a time that the secondary current of the transformer 10 reaches zero to a time that the primary current of the transformer 10 is started to flow (corresponding to the length of the discontinuation period) (in other words, a switching frequency is changed by controlling the frequency of the ramp wave in order to shorten the discontinuation period). In the example, the ramp wave generating section 20 is constituted by a frequency control circuit 24 and a ramp wave generating circuit 25.

The frequency control circuit 24 generates a signal for controlling the frequency of a ramp wave based on a control signal sent from the timing detecting section 19 and a control signal (a PWM pulse) sent from the PWM comparator 22, and sends the same signal to the ramp wave generating circuit 25 in the second stage.

The ramp wave generating circuit 25 serves to generate a ramp wave having a frequency controlled variably in response to the control signal sent from the frequency control circuit 24 and to send the ramp wave to (the negative input terminal of) the PWM comparator 22.

In the circuit, a feedback loop for power control is formed. By a level comparison of an error signal indicative of an error between the level of a detection signal related to the output voltage Vout and the reference voltage VREF of the error amplifier 21 with a ramp wave, duty control is carried out (the duty cycle of a PWM pulse is changed), and the output signal (PWM pulse) of the PVVM comparator 22 is sent to the switching element 11 through the buffer 23, thereby driving the same element 11.

Then, the frequency of the ramp wave is controlled based on the detection signal of the timing detecting section 19 and the PWM pulse so that a switching operation is carried out in the current boundary mode.

Figure 7:
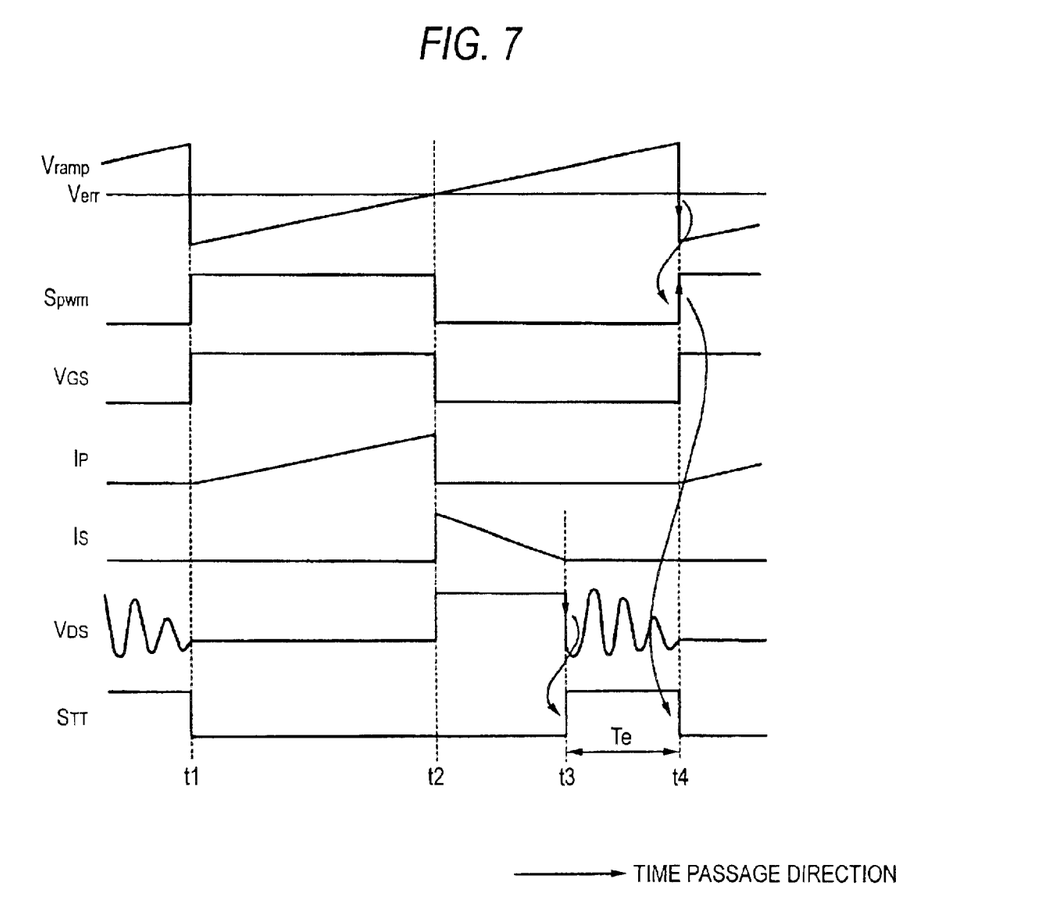
FIG. 7 is a waveform diagram for explaining a circuit operation in FIG. 6.

FIG. 7 is a waveform diagram for explaining the operation, and each mark shown in the drawing has the following meaning.

"Vramp"=a signal level indicative of a ramp wave generated by the ramp wave generating circuit 25, "Verr"=an output signal level of the error amplifier 21, "Spwm"=an output signal of the PWM comparator 22 (PWM pulse), and "STT"=a signal indicative of an H (high) level for the discontinuation period and representing a temporal error amount for the current boundary mode (the discontinuation period is zero).

"VGS", "VDS", "Ip" and "Is" have been described above.

Moreover, each time indicated as t1 to t4 has the following meaning.

"t1"=a leading edge of Spwm in which Vramp is dropped to be lower than Verr,

"t2"=a trailing edge of Spwm in which Vramp is equal to Verr,

"t3"=a time that the secondary current Is reaches zero, and

"t4"=a time Spwm first rises after t3.

An error period "Te" between t3 and t4 is equivalent to the discontinuation period.

In the drawing, Verr is set to be constant for convenience of the description, and the level Vramp of the ramp wave is started to be gradually raised with a constant inclination at the time t1 and Spwm and VGS also fall at the time t2 that Vramp is coincident with Verr.

While the primary current Ip is gradually increased for the period from t1 to t2, the current reaches zero at the time t2.

The secondary current Is rises at the time t2 to have a certain value and is then decreased with the passage of time, and reaches zero at the time t3.

VDS rises at the time t2 and then falls at the time t3, and does not reach zero immediately but converges through a damping oscillation. By detecting a trailing edge at t3 related to VDS, it is possible to define the beginning of an error period Te. Thereafter, Spwm rises at the time t4 that Vramp is rapidly dropped to be lower than Verr. If the edge is detected, therefore, the end of the error period Te can be defined.

In the example, thus, the length of the error period Te is not zero. For this reason, the current discontinuation mode is set. If the frequency of the PWM ramp wave is changed such that the length of the error period approximates to zero, a switching operation can be finally carried out in such a state that the same period is zero, that is, in the current boundary mode and the frequency control circuit 24 can carry out control therefor.

In the invention, driving control is carried out in the current boundary mode in accordance with the method indicated by the following (1) to (4).

(1) The frequency of a PWM pulse is previously initialized to have a small value such that the switching operation can be first carried out in the current discontinuation mode, (2) the discontinuation period is measured (more specifically, the length of the error period Te is measured), (3) the frequency of a ramp wave is gradually changed (the frequency is increased) in such a direction that the length of the discontinuation period is decreased, thereby approximating to the current boundary mode (the length of the error period Te reaches zero), and (4) the operation is stabilized in the current boundary mode by the control of the (2) and (3).

In the (3), the frequency of the ramp wave is not changed suddenly based on the length of the discontinuation period measured in the (2) but control is carried out to gradually increase the frequency so as to shorten the length of the discontinuation period more and more and to slowly approximate to the intended current boundary mode. Finally, a stable operation can be guaranteed in the same mode.

Next, description will be given to an example of a circuit structure mainly including the ramp wave generating section 20.

Figure 8:
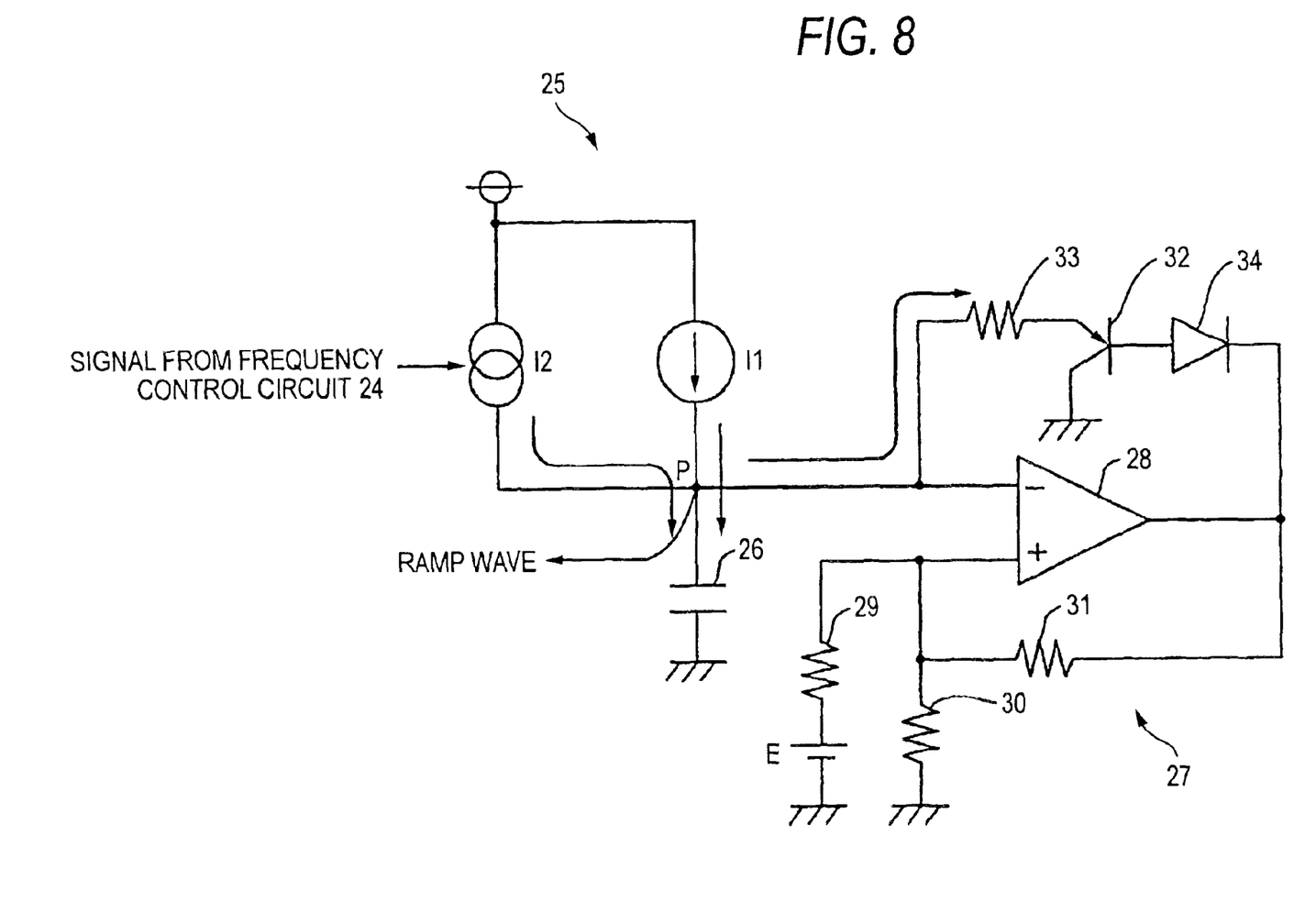
FIG. 8 is a diagram showing an example of the structure of a ramp wave generating circuit.

FIG. 8 shows a structure using a plurality of current sources, a capacitor and a comparator as an example of the structure of the ramp wave generating circuit 25.

Current sources indicated as "I1" and "I2" respectively serve to supply a charging current to a capacitor 26, and the current source I1 is set to be a constant current source and the current source I2 is set to be a variable current source to be controlled in response to a signal sent from the frequency control circuit 24. In other words, I1 and I2 are provided in parallel for the current sources to be connected to the capacitor 26, and a total current "I" which is equal to the sum of the current values of I1 and I2 is supplied to the capacitor 26 provided in series to the current sources through a charging path reaching the capacitor 26.

A hysteresis comparator 27 is constituted by using an arithmetic amplifier 28 and has an inverted input terminal connected to a node of the capacitor 26 and the current sources I1 and I2 (which is indicated as a point "P" in the drawing), and a reference voltage "E" indicated by the mark of a constant voltage source is supplied to the non-inverted input terminal of the arithmetic amplifier 28 through a resistor 29. The non-inverted input terminal is grounded through a resistor 30 and is connected to the output terminal of the arithmetic amplifier 28 through a resistor 31.

A PNP transistor 32 forms an emitter follower for a high speed operation. When the transistor 32 is ON, the discharge path of the capacitor 26 is formed and the transistor 32 has an emitter connected to the node P through a resistor 33. Moreover, the base of the transistor 32 is connected to the anode of a diode 34 and the cathode of the diode 34 is connected to the output terminal of the arithmetic amplifier 28. In the case in which the electric potential of the node P exceeds a threshold defined in the hysteresis comparator 27, the transistor 32 is turned ON in response to a signal output from the arithmetic amplifier 28 so that the capacitor 26 is discharged. The diode 34 is provided for protecting a backward voltage applied between the base and the emitter in the PNP transistor 32.

As shown in the drawing, the terminal voltage of the capacitor 26 which is obtained from the node P is equivalent to Vramp described above and is sent as a ramp wave to the PWM comparator 22.

Figure 9:
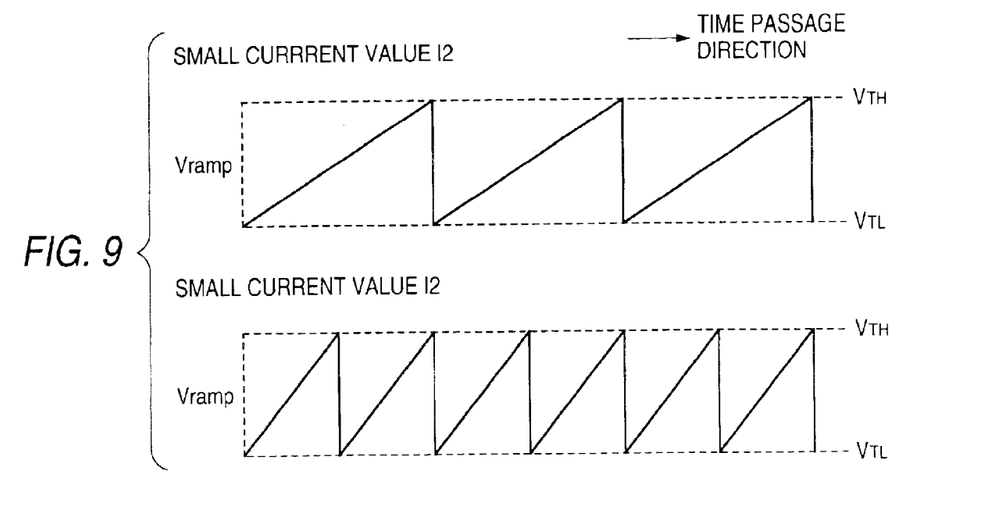
FIG. 9 is a waveform diagram for explaining a circuit operation in FIG. 8.

FIG. 9 is a waveform diagram for explaining the operation of the ramp wave generating circuit 25. In FIG. 9, an upper drawing shows a Vramp waveform in the case in which a current value obtained by the current source I2 is small, and a lower drawing shows a Vramp waveform in the case in which the current value obtained by the current source I2 is great. "VTH" and "VTL" in the drawing indicate a threshold determined by the hysteresis comparator 27 (a constant comparison reference value), and "VTH" indicates an upper limit threshold and "VTL" indicates a lower limit threshold.

First of all, if the current value obtained by the current source I2 is small, a charging current to flow to the capacitor 26 which is determined by the total current I of I2 and I1 is comparatively small so that the inclination of a ramp wave is small. When Vramp reaches VTH, the output signal of the arithmetic amplifier 28 is set to have an L (low) level. Consequently, the transistor 32 is turned ON so that the capacitor 26 is discharged. Thus, when Vramp is rapidly dropped to reach VTL, the output signal of the arithmetic amplifier 28 is set to have an H (high) level. Consequently, the transistor 32 is turned OFF and the capacitor 26 is charged by I2 and I1 so that Vramp is raised again. Thus, such a cycle is repeated periodically.

In this case, the inclination of the ramp wave is small. By a comparison with the lower drawing, it is apparent that the frequency is low.

If the current value obtained by the current source I2 is great, moreover, a charging current to flow to the capacitor 26 which is determined by the total current I is comparatively large so that the inclination of the ramp wave is rapidly increased. When Vramp reaches VTH, the output signal of the arithmetic amplifier 28 is set to have the L (low) level. Consequently, the transistor 32 is turned ON so that the capacitor 26 is discharged. Thus, when Vramp is rapidly dropped to reach VTL, the output signal of the arithmetic amplifier 28 is set to have the H (high) level. Consequently, the transistor 32 is turned OFF and the capacitor 26 is charged by I2 and I1 so that Vramp is raise again. Thus, such a cycle is repeated periodically.

In this case, the inclination of the ramp wave is great. By a comparison with the upper drawing, therefore, it is apparent that the frequency is high.

By changing the current value of I2, thus, the inclination of the ramp wave is changed so that the frequency can be varied.

While there has been employed the configuration in which the current value of the current source I1 is set to be constant and the current value of the current source I2 is changed in the example, only I2 may be provided to change the current value in response to a signal sent from the frequency control circuit 24.

Figure 10:
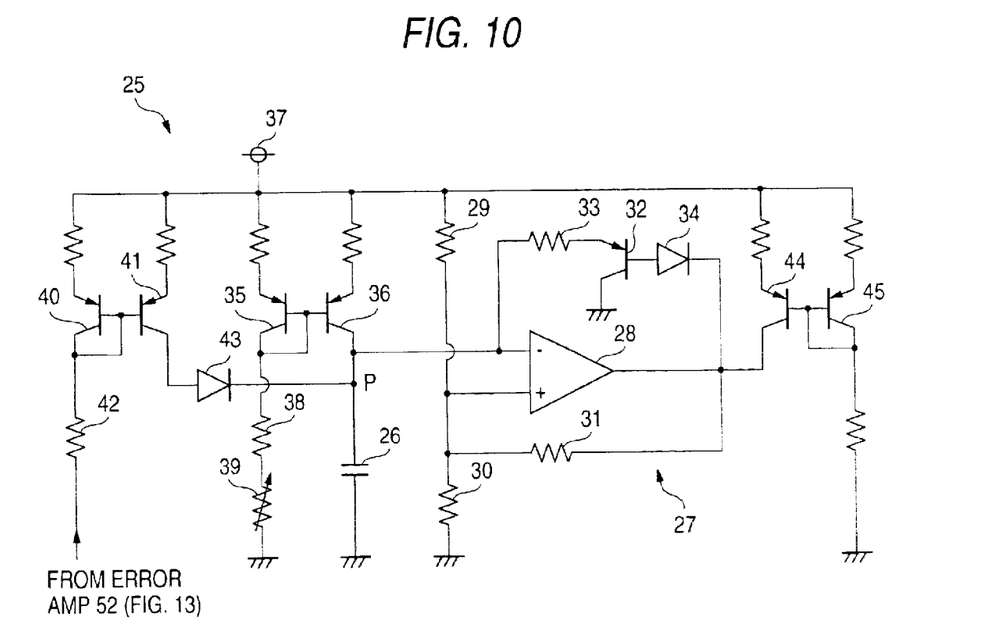
FIG. 10 is a circuit diagram showing an example of the structure of the ramp wave generating circuit.

FIG. 10 shows a specific example of the ramp wave generating circuit 25.

A current mirror circuit formed by PNP transistors 35 and 36 is used for the current source I1 and the emitters of the transistors 35 and 36 are connected to a power terminal 37 through respective resistors. The bases of the transistors 35 and 36 are connected to each other and are connected to the collector of the transistor 35, and furthermore, are grounded through a resistor 38 and a variable resistor 39 (for setting a current value). Moreover, the collector of the transistor 36 is connected to the capacitor 26 and is connected to the inverted input terminal of the arithmetic amplifier 28 constituting the hysteresis comparator 27.

A current mirror circuit formed by PNP transistors 40 and 41 is used for the variable current source 12, and the emitters of the transistors 40 and 41 are connected to the power terminal 37 through respective resistors. The bases of the transistors 40 and 41 are connected to each other and are connected to the collector of the transistor 40. The collector of the transistor 40 is connected through a resistor 42 to the output terminal of (an arithmetic amplifier constituting) an error amplifier which will be described below. Moreover, the collector of the transistor 41 is connected to the node P through a diode 43 in a forward direction.

The connecting relationship between the transistor 32 and the diode 34 to the arithmetic amplifier 28 is the same as that of FIG. 8. Moreover, a reference voltage to be supplied to the non-inverted input terminal of the arithmetic amplifier 28 is obtained from the voltage dividing resistors 29 and 30. A current mirror circuit formed by PNP transistors 44 and 45 is provided in the output stage of the arithmetic amplifier 28 and the collector of the transistor 44 is connected to the output terminal of the arithmetic amplifier 28 and the cathode of the diode 34.

Figure 11:
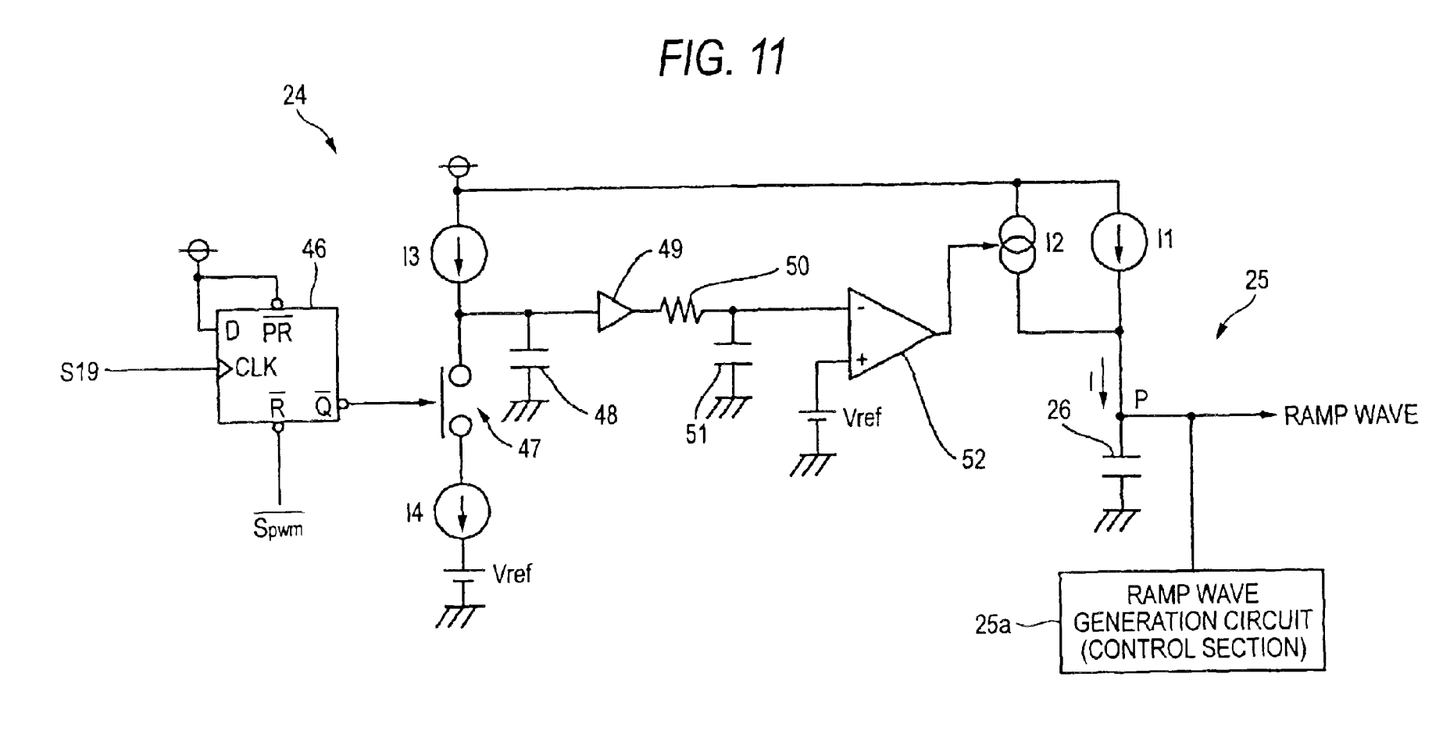
FIG. 11 is a diagram showing an example of the structure of a frequency control circuit.

FIG. 11 shows an example of the structure of the frequency control circuit 24 together with a part of the same circuit in order to illustrate a relation to the ramp wave generating circuit 25 (the current sources 11 and 12, the capacitor 26).

A detection signal "S19" shown in the drawing is a signal obtained by the timing detecting section 19. More specifically, the timing detecting section 19 detects a voltage related to the switching element 11 (a voltage applied to non-control terminals, VDS in the FET) and detects a time that the secondary current of a transformer reaches zero from the voltage waveform. In the example, S19 indicates the H level in a timing in which the secondary current Is reaches zero. The signal can be obtained by detecting the trailing edge of VDS and is supplied to the clock signal input terminal (CLK) of a D flip-flop 46.

In the D flip-flop 46, a predetermined voltage is supplied to a D terminal and a preset terminal (indicated as "PR" having a bar thereabove in the drawing), and furthermore, a NOT signal (indicated as "Spwm" having a bar thereabove in the drawing) of Spwm representing a PWM pulse wave is supplied to a reset terminal (indicated as "R" having a bar thereabove in the drawing). More specifically, when Spwm rises to have the H level, the D flip-flop 46 is reset.

Both current sources indicated as "I3" and "I4" are constant current sources, and the current source I4 is connected to the current source I3 through a switch element 47 (indicated as a mark of a switch in the drawing). The current source I4 has a greater current value than that of the current source I3 (when the current values of the current sources are set to be I3 and I4, "I3<I4" is set).

A transistor is used for the switch element 47, for example, and an ON/OFF state thereof is defined upon receipt of a Q bar output (indicated as "Q" having a bar thereabove in the drawing) of the D flop-flop 46. More specifically, when the Q bar output has the H level (or the Q output has the L level), the switch element 47 is turned ON.

A capacitor 48 has one of ends connected between the current source 13 and the switch element 47 and has the other end grounded. The capacitor 48 is provided for converting, into a voltage, a temporal error amount corresponding to the length of the discontinuation period (which is an amount obtained by setting an operation in the current boundary mode to be a zero reference and is equivalent to the length of the error period). In other words, the current source I3 is used for charging the capacitor 48 and the current source I4 is used for discharging the capacitor 48. When the switch element 47 is set in an OFF state (the error period), the terminal voltage of the capacitor 48 is raised. When the switch element 47 is set in an ON state, the terminal voltage of the capacitor 48 is dropped.

The terminal voltage of the capacitor 48 is sent to a voltage buffer 49. The output terminal of the voltage buffer 49 is connected to one of the ends of a resistor 50, and the other end of the resistor 50 is grounded through a capacitor 51 and is supplied to the negative input terminal of an error amplifier 52. A predetermined reference voltage "Vref" indicated as a mark of the voltage source is supplied to the positive input terminal of the error amplifier 52, and a difference (an error) between the terminal voltage of the capacitor 51 and Vref is sent from an output terminal to the power source I2. More specifically, if the error is greater, the current value of the current source I2 is increased. As a result, the frequency of the PWM ramp wave is raised.

In the drawing, I1, I2, the capacitor 26 and a control section (including the hysteresis comparator 27) 25a are shown as the components of the ramp wave generating circuit 25.

Figure 12:
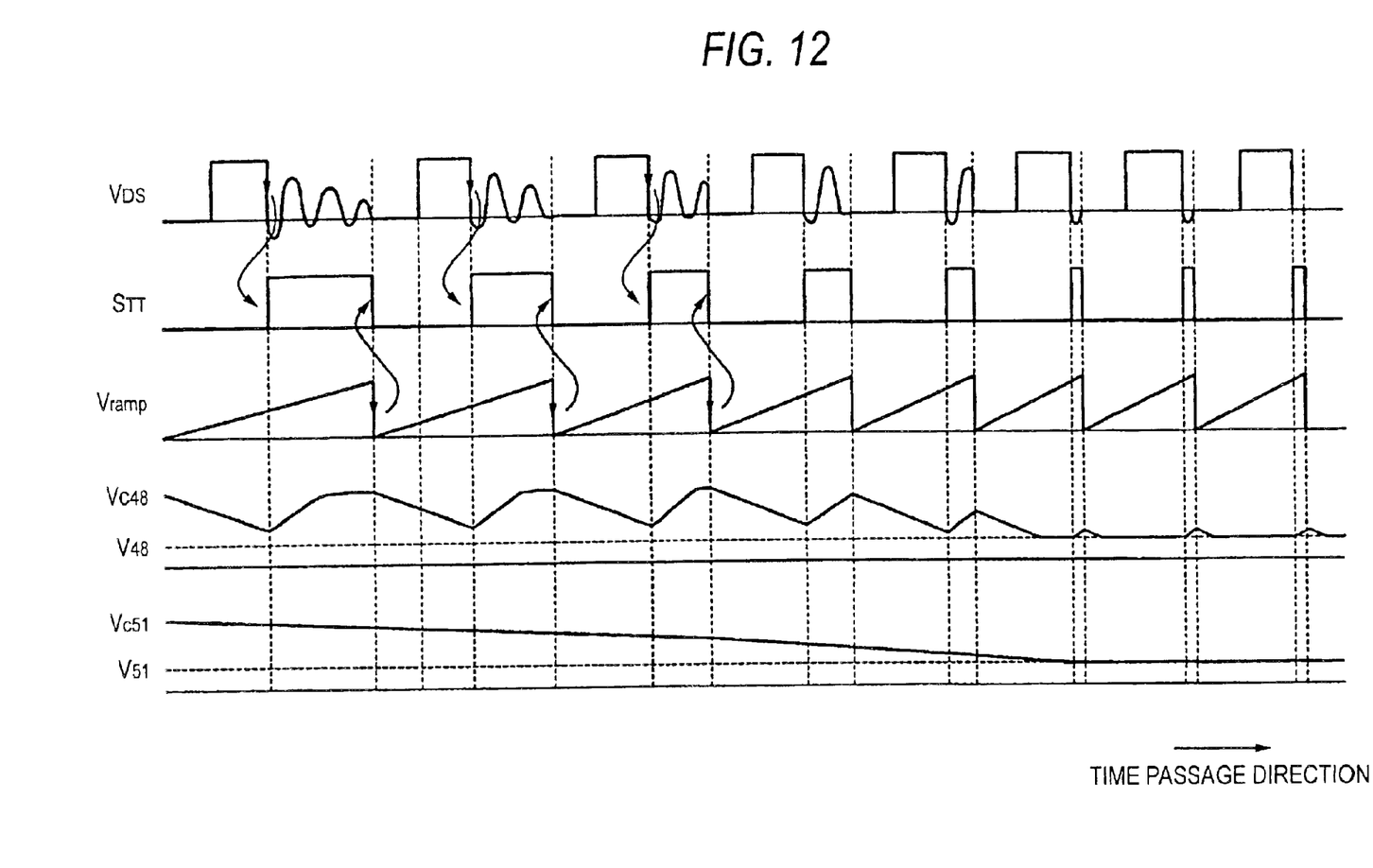
FIG. 12 is a waveform diagram for explaining a circuit operation in FIG. 11.

FIG. 12 is a waveform diagram for explaining the operation of the frequency control circuit 24, illustrating VDS, STT, Vramp, Vc48 and Vc51. Vc48 indicates the terminal voltage of the capacitor 48 and Vc51 indicates the terminal voltage of the capacitor 51, and levels "V48" and "V51" shown respectively in broken lines in the diagram indicate voltages applied during an operation in the current boundary mode. Moreover, "STT" corresponds to the Q output signal of the D flip-flop 46.

As shown in the procedure (1), the frequency of the PWM pulse is preset to be low such that the operation is carried out in the current discontinuation mode in an initial condition (an initial condition in a stationary state excluding an early stage of light-up of a discharge lamp). In other words, the frequency of a ramp wave is defined based on the value of the total current I (=I1+I2) of the current sources I1 and I2 in the ramp wave generating circuit 25 and the variable current source I2 is controlled by the output of the error amplifier 52. Consequently, it is preferable that the smallest current value of I2 and the current value of I1 should be set respectively to carry out the operation in the current discontinuation mode when the current I to be supplied to the capacitor 26 has the smallest value.

The signal STT rises synchronously with a time of fall of VDS which is equivalent to a time that the secondary current Is of the transformer 10 reaches zero, and the Q output signal of the D flip-flop 46 is set to have the H level upon receipt of the signal STT. Then, when the PWM pulse Spwm rises (the time of the fall of a ramp wave), the D flip-flop 46 is reset so that the Q output signal is set to have the L level. In other words, this period is equivalent to the error period (Te) and a length thereof indicates a temporal error amount.

The switch element 47 is turned ON/OFF upon receipt of the Q bar output signal of the D flip-flop 46. Therefore, the switch element 47 is set in the OFF state during the error period and the capacitor 48 is charged so that the voltage Vc48 is raised. Moreover, the switch element 47 is turned ON for a period other than the error period and the capacitor 48 is discharged (I3<I4 is obtained) so that the voltage Vc48 is gradually dropped. While such an operation is repeated, the level of Vc51 is gradually reduced. In other words, the temporal error amount converted into a voltage in the capacitor 48 is transmitted through the voltage buffer 49 to the resistor 50 and the capacitor 51 which constitute an integrating circuit and the current value of the variable current source I2 is controlled according to a difference between Vc51 and Vref. As a result, the frequency of the PWM ramp wave is changed. When the level of Vc51 is high and the difference from Vref is great, the current value of I2 is increased so that the frequency of the ramp wave is increased. Consequently, the length of the error period indicated as STT is gradually reduced. Finally, Vc51 reaches the voltage level V51 during the operation in the current boundary mode to proceed to a stable operation in the same mode.

Referring to the temporal error amount which is equivalent to the length of the discontinuation period, thus, a period length from a time that Is reaches 0 A to a time that Ip is started to rise and the current I (I2 in the example) to be supplied to the capacitor 26 of the ramp wave generating circuit 25 is changed correspondingly to control the PWM ramp wave and the frequency of the PWM pulse generated from the PWM ramp wave and the output of the error amplifier. Consequently, a switching operation in the current boundary mode can be implemented. The frequency of the PWM ramp wave does not need to be determined at a time corresponding to the level of Vc51. Therefore, it is preferable that the frequency should be gradually increased to approximate to the frequency in the current boundary mode according to the result of an error operation carried out plural times and should be finally locked into a frequency in the same mode (although the current discontinuation mode is set at an early stage of the start of the operation, the switching frequency is changed in order to gradually approximate to the current boundary mode and to proceed to the same mode.

The frequency control circuit 24 detects a duration (a discontinuation period) from a time that the secondary current Is of the transformer 10 reaches zero to a time that the primary current of the transformer 10 is started to flow based on the detection signal S19 sent from the timing detecting section 19 and the control signal Spwm sent to the switching element, and controls the frequency of a ramp wave by changing the inclination of the ramp wave to be increased if the period is longer.

It is preferable that the control of a transition to the current boundary mode and driving control in the same mode should be carried out in the stable lighting state of a discharge lamp in the application to a discharge lamp lighting circuit. In other words, the "stable lighting state" has the meaning of excluding an unstable state obtained immediately after the light-up of the discharge lamp and a transient state before stationary lighting is carried out. The control is not recommended in such a situation that the lighting state of the discharge lamp becomes unstable so that the discharge lamp goes out.

Figure 13:
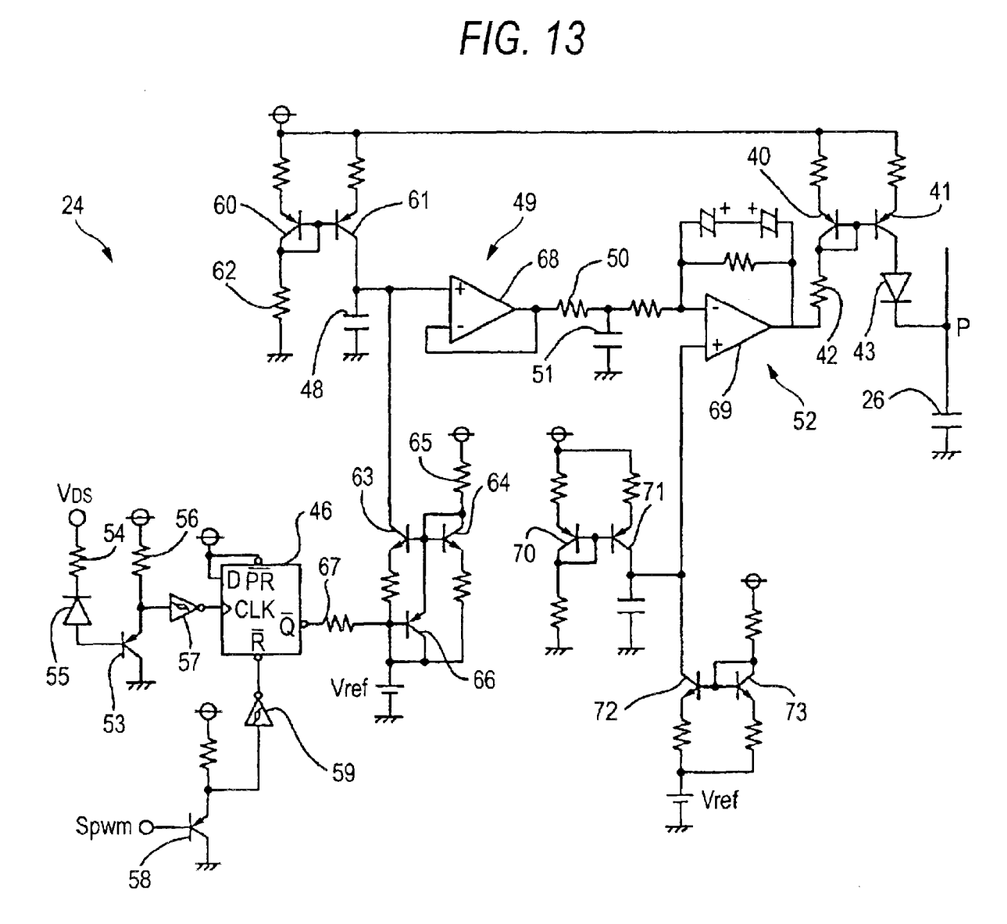
FIG. 13 is a circuit diagram showing an example of the structure of the frequency control circuit.

FIG. 13 shows an example of a specific structure for the frequency control circuit 24.

VDS of the FET to be the switching element 11 is supplied to the base of a PNP transistor 53 of an emitter follower (a collector is grounded) through a resistor 54 and a diode 55. Moreover, a predetermined power voltage is supplied to the emitter of the transistor 53 through a resistor 56, and furthermore, an emitter output is supplied to the clock signal input terminal CLK of the D flip-flop 46 through a Schmitt trigger type NOT gate 57. More specifically, when VDS is set to have the L level, the transistor 53 is turned ON so that an H level signal is supplied to the input terminal CLK of the D flip-flop 46. A limiter is formed by the transistor 53 of the emitter follower in order to drive a DC-DC converter by using a high-speed switching element.

Referring to the PWM pulse Spwm, a PNP transistor 58 of the emitter follower is provided for supplying an emitter output to the reset terminal of the D flip-flop 46 through a Schmitt trigger type NOT gate 59.

The current source I3 is constituted by a current mirror circuit using PNP transistors 60 and 61, and the emitter of each of the transistors 60 and 61 is connected to a power terminal through each resistor. The bases of the transistors 60 and 61 are connected to each other and are connected to the collector of the transistor 60, and furthermore, are grounded through a resistor 62 and the capacitor 48 is connected to the collector of the transistor 61.

Moreover, the current source I4 is constituted by a current mirror circuit using NPN transistors 63 and 64, and a predetermined voltage Vref (indicated by a mark of a constant voltage source in the drawing) is supplied to the emitter of each of the transistors 63 and 64 through a resistor connected thereto. The bases of the transistors 63 and 64 are connected to each other and are connected to the collector of the transistor 64, and the same collector is connected to a power terminal through a resistor 65. Moreover, the collector of the transistor 63 is connected to a node of the capacitor 48 and the transistor 61.

A PNP transistor 66 is provided corresponding to the switch element 47. In other words, the transistor 66 has a base connected to the Q bar output terminal of the D flip-flop 46 through a resistor 67 and has an emitter connected to the bases of the transistors 63 and 64. A predetermined voltage Vref indicated by a mark of a constant voltage source is supplied to the collector of the transistor 66.

The voltage buffer 49 has a structure of a voltage follower using an arithmetic amplifier 68, and an integrating circuit including the resistor 50 and the capacitor 51 is provided in an output stage thereof. The terminal voltage of the capacitor 51 is sent through a resistor to the inverted input terminal of an arithmetic amplifier 69 constituting the error amplifier 52.

The variable current source I2 is constituted by a current mirror circuit using the PNP transistors 40 and 41 as described above, and the output terminal of the arithmetic amplifier 69 is connected to the collector of the transistor 40 and the bases of the transistors 40 and 41 through the resistor 42. The collector of the transistor 41 is connected to the capacitor 26 through the diode 43 in a forward direction.

Referring to a reference voltage Vref to be supplied to the non-inverted input terminal of the arithmetic amplifier 69, a current mirror circuit including a pair of PNP transistors 70 and 71 and a pair of NPN transistors 72 and 73 and a necessary passive element are used for the same non-inverted input terminal.

As described above, the driving control is started in the state in which the current discontinuation mode is initialized and the duration from the time that the secondary current Is of the transformer 10 reaches zero to the time that the primary current Ip of the transformer 10 is started to flow is detected, and the switching frequency is changed by the control means to shorten the duration. Thus, an approach to the current boundary mode is gradually carried out so that stable driving control can be finally performed in the same mode.

By the operation in the current boundary mode, moreover, the characteristic (electric efficiency) of the whole DC-DC converting circuit is not influenced by the reverse recovery time of a rectifier diode itself. Consequently, it is not necessary to use a high-speed rectifier diode. Thus, a cost can be reduced.

For example, the structure is applied to the discharge lamp lighting circuit of a lighting unit for an automobile, resulting in a contribution to a reduction in the size of the device. More specifically, since an installation space is limited in use for a vehicle, a request for the reduction in the size is strict. For this reason, an increase in a frequency and an enhancement in an efficiency of the DC-DC converting circuit constituting the lighting circuit are indispensable and can be obtained by using the control method described above.

As is apparent from the above description, according to the first aspect of the invention, the switching frequency is controlled such that the duration from the time that the secondary current of the transformer reaches zero to the time that the primary current of the transformer is started to flow is caused to approximate to zero. Therefore, the driving control in the current boundary mode can be implemented to cope with an increase in the switching frequency, and furthermore, to enhance an electric efficiency. In addition, it is not necessary to use a high-speed switch element. Therefore, a cost can be prevented from being increased remarkably.

According to the second aspect of the invention, it is possible to obtain the control signal to be sent to the switching element by detecting the time that the secondary current of the transformer reaches zero, controlling the frequency of a ramp wave and transmitting the same ramp wave to the arithmetic control section. Consequently, it is possible to avoid a great change in a circuit structure and a control method.

According to the third aspect of the invention, it is possible to simplify the circuit structure of the timing detecting section.

According to the fourth aspect of the invention, it is possible to control the frequency of the ramp wave corresponding to the duration from the time that the secondary current of the transformer reaches zero to the time that the primary current of the transformer is started to flow. Consequently, it is possible to smoothly carry out a transition to the current boundary mode.

What is claimed is:

1. A DC voltage converting circuit having a flyback type circuit structure including a transformer and a switching element provided on a primary side thereof and comprising control means for carrying out control in such a manner that the transformer stores energy while the switching element is set in an ON state, and outputs the energy from a secondary winding while the switching element is set in an OFF state, and the switching element is turned ON when the energy is completely output from the secondary winding,     wherein a duration from a time that a secondary current of the transformer reaches zero to a time that a primary current of the transformer is started to flow is detected, and a switching frequency is changed by the control means in order to shorten the duration.

2. The DC voltage converting circuit according to claim 1, further comprising:

an output detecting section for detecting an output voltage or current of the transformer;

a timing detecting section for detecting the time that the secondary current of the transformer reaches zero;

a ramp wave generating section for generating a ramp wave having a frequency controlled variably in response to a detection signal sent from the timing detecting section and a control signal sent to the switching element; and an arithmetic control section for sending a control signal to the switching element upon receipt of a detection signal from the output detecting section and the ramp wave from the ramp wave generating section.

3. The DC voltage converting circuit according to claim 2, wherein a voltage applied to the switching element is detected and the timing detecting section detects, from a voltage waveform, the time that the secondary current of the transformer reaches zero.

4. The DC voltage converting circuit according to claim 2, further comprising a frequency control circuit for controlling a frequency of the ramp wave by detecting the duration from the time that the secondary current of the transformer reaches zero to the time that the primary current of the transformer is started to flow based on the detection signal sent from the timing detecting section and the control signal sent to the switching element, and changing an inclination of the ramp wave to be increased if the duration is longer.

5. The DC voltage converting circuit according to claim 3, further comprising a frequency control circuit for controlling a frequency of the ramp wave by detecting the duration from the time that the secondary current of the transformer reaches zero to the time that the primary current of the transformer is started to flow based on the detection signal sent from the timing detecting section and the control signal sent to the switching element, and changing an inclination of the ramp wave to be increased if the duration is longer.

* * * * *